Oct. 27, 1936.  G. G. GREGER  2,058,787
STORAGE BATTERY CONNECTION
Filed May 2, 1931   3 Sheets-Sheet 1
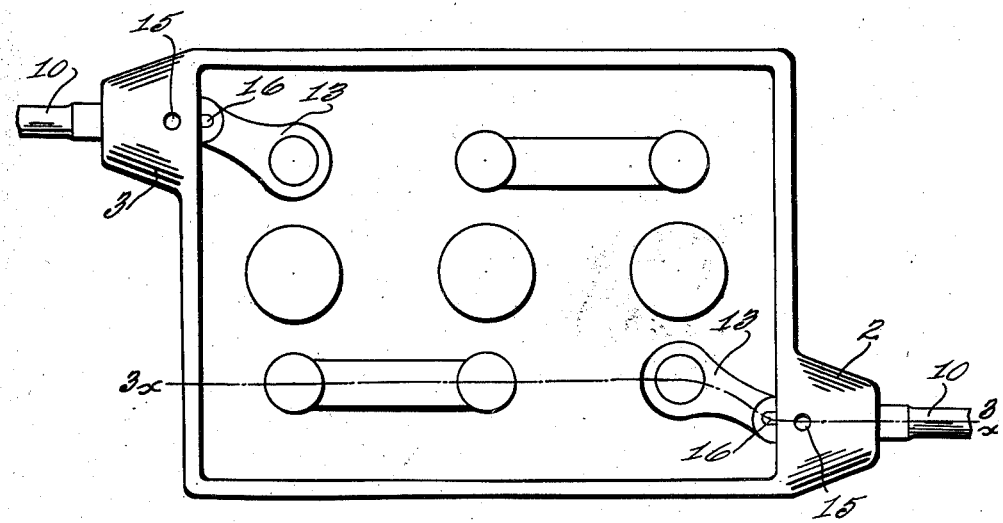
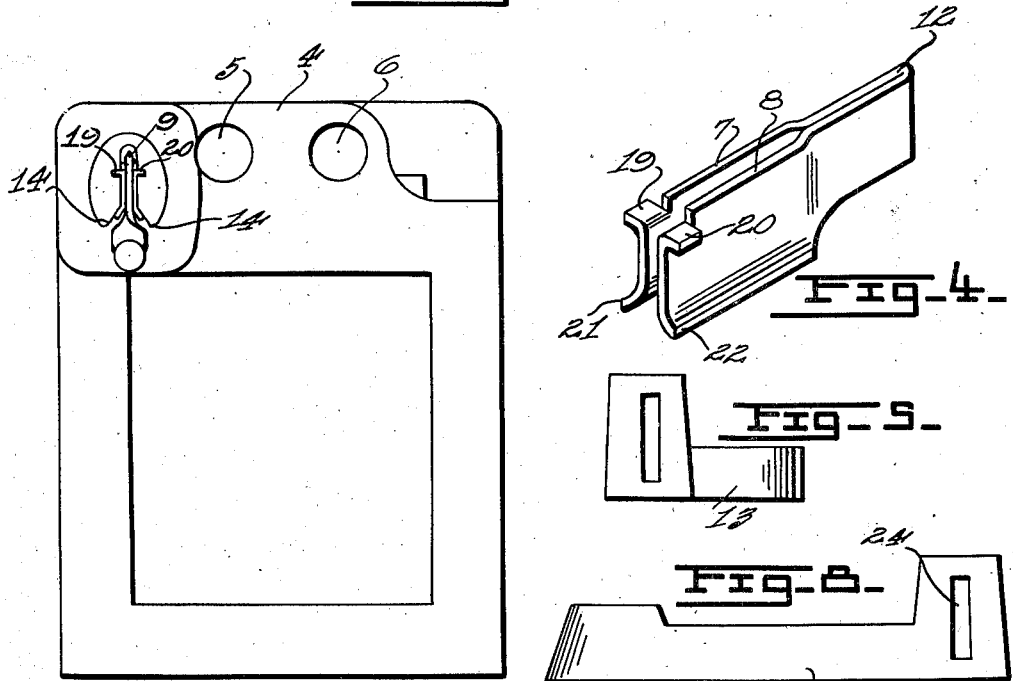
Inventor
George G. Greger
By Frank Kiefer
Attorney Oct. 27, 1936.   G. G. GREGER   2,058,787
STORAGE BATTERY CONNECTION
Filed May 2, 1931   3 Sheets-Sheet 2
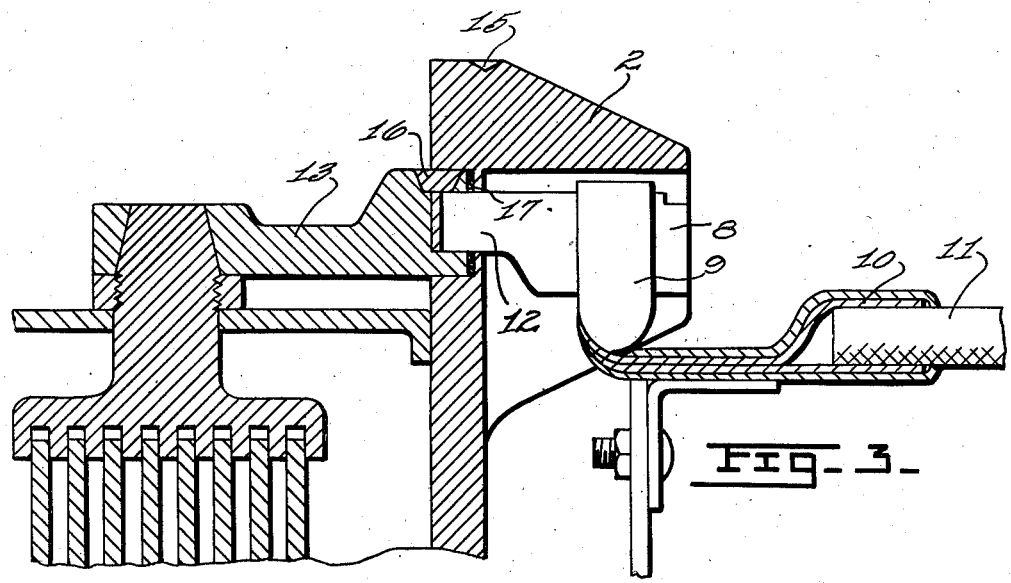
Fig-3-
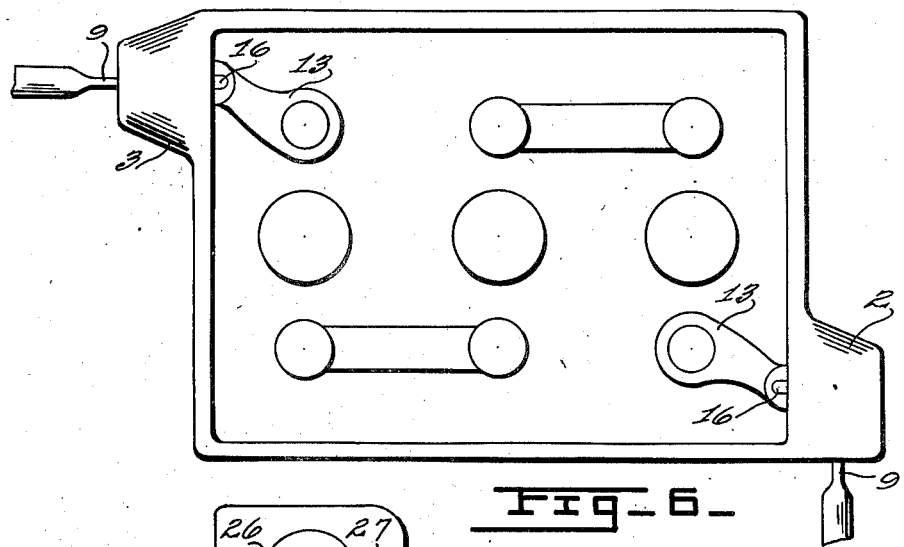
Fig-6-
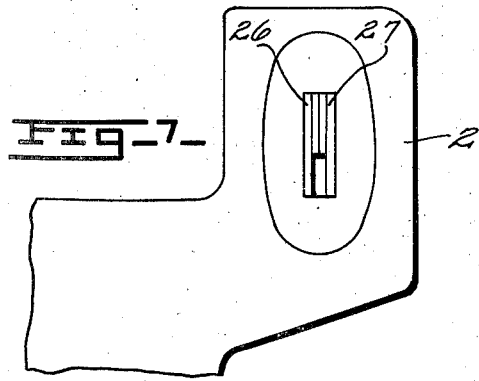
Fig-7-
Inventor
George G. Greger
By Frank Keifer
Attorney Oct. 27, 1936.                G. G. GREGER                2,058,787
                        STORAGE BATTERY CONNECTION
                           Filed May 2, 1931            3 Sheets-Sheet 3
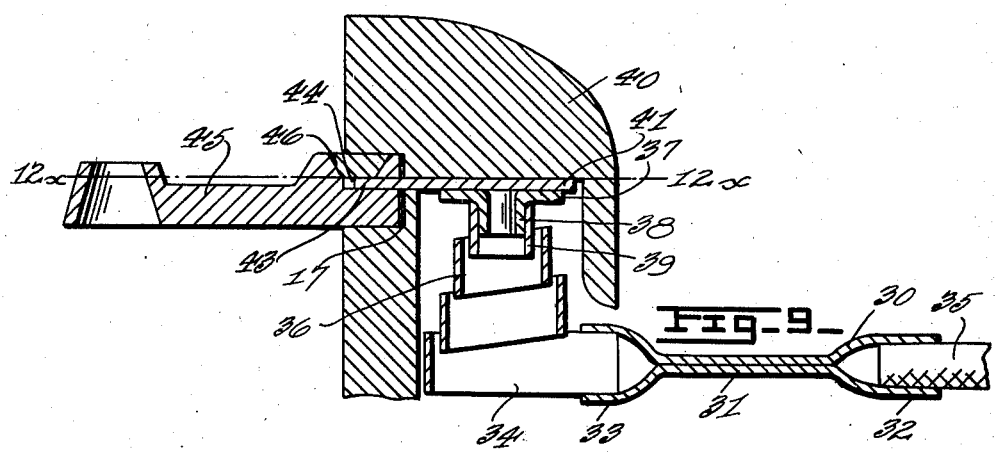
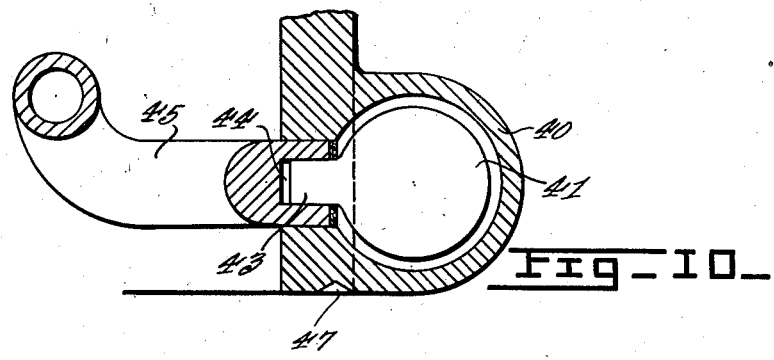
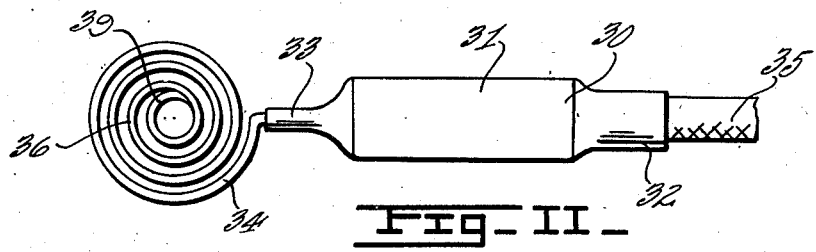
Inventor
George G. Greger
By Frank Kiefer
Attorney Patented Oct. 27, 1936

2,058,787

UNITED STATES PATENT OFFICE 2,058,787

STORAGE BATTERY CONNECTION

George G. Greger, Toledo, Ohio

Application May 2, 1931, Serial No. 534,598

8 Claims. (Cl. 136—171)

The object of this invention is to make a new and improved connection between the plates of a sulphuric acid battery and the cables by which the battery is charged or discharged or by which the current is distributed to the car.

Another object of the invention is to avoid the use of bolts, screws and nuts or tools in making the connection.

Another object of the invention is to make it possible to install and connect or disconnect and remove the battery quickly and easily without the use of tools.

Another object of the invention is to avoid the possibility of jarring, cracking, loosening or weakening the sealing elements of the battery.

These and other objects of the invention will be illustrated in the drawings, described in the specification and pointed out in the claims at the end thereof.

In the drawings:

Figure 1 is a top plan view of the battery provided with my improved connections.

Figure 2 is an end elevation of the battery viewed from the right-hand end of Figure 1.

Figure 3 is a vertical longitudinal section partly broken away taken on the line 3x 3x of Figure 1.

Figure 4 is a perspective detail view of the female part of the switch.

Figure 5 is an end elevation of the lead connection or tie bar between the switch and the battery grid viewed from the right-hand end of Figure 1.

Figure 6 is a top plan view of the battery showing a modified form of my improved connection.

Figure 7 is a side elevation of the housing illustrated in the lower right-hand corner of Figure 6.

Figure 8 is a side elevation of the lead connection or tie bar used at the lower right-hand corner of Figure 6.

Figure 9 is a vertical sectional elevation of a modified form of the connection.

Figure 10 is a horizontal section on the line 12x 12x of Figure 11.

Figure 11 is a top plan view of the copper connection shown in Figure 9.

In the drawings like reference numerals indicate like parts.

It will be understood that battery boxes are ordinarily made of hard rubber or equivalent composition, which is molded to the size desired for the battery. My improved battery box is made of hard rubber or similar composition and as shown in Figure 1 at the lower right-hand corner, I mold a housing 2 and at the upper left-hand corner I mold a housing 3, both of which are integral with the box. At the side of each of these housings the battery box extends upward as indicated at 4, Fig. 2, and in this upper extension are two openings 5 and 6 in which the fingers may be engaged to get hold of the box for the purpose of lifting or handling it.

The housing shown at the lower right-hand corner of Figure 1 and at the upper left hand corner of Figure 2 is shown in longitudinal vertical section in Figure 3. As illustrated, this housing extends outwardly from the battery box and is located above the upper line of the plates. This housing has an opening therethrough, one side of which is adapted to receive the female switch plates 7 and 8, between which engages the male switch plate 9. At the other end of the connection of which the male switch plate 9 forms a part, is formed a socket 10 which is adapted to receive the end of a cable 11 which leads to the starter motor or to the ignition or lighting system or to the ground, respectively, as the case may be.

On the male connection on the grounded side of the battery the cable socket will be omitted and the end of the connection may be flattened and shaped so that it can be bolted and fastened permanently to or grounded on the frame of the car directly, thus omitting the usual cable.

The pocket in the housing opens on the inward side of the battery toward one of the terminal posts of the battery. Into this pocket a tongue 12 extends from the female part of the switch, which part is inserted from the outside of the battery. The pocket in the housing toward the inside of the battery is slightly tapered and into this pocket slides the end of a lead connecting bar or link 13 that has a blind socket on the end thereof opening horizontally, that is adapted to receive the tongue 12 formed on the female part of the switch. The opposite end of this lead connection 13 has a vertical opening therein, tapered, that is adapted to fit down over the cone-shaped terminal post of the battery plate and make a close connection therewith. This connection is completed by welding or burning the two pieces of metal together. The under side or bottom of the housing has a pocket extending downward and outward from the pocket that holds the female switch. This pocket is flared outwardly at the bottom as indicated at 14 in Figure 2, and is adapted to act as a guide for the male switch blade 9 to find its proper position between the female switch blades 7 and 8 when it is inserted.

It will be understood that the top of the lead connection 13 is provided with a groove or gate 16 formed in the top thereof, one end of which is exposed outside of the housing when the lead connection is in place and engaged with the tongue. Into this gate is poured liquid and melted metal, which flows into the socket and solders the joint between the lead connection and the copper tongue making the two parts one solid piece. The lead connection makes a close tapered fit with the socket in the housing so that the metal cannot flow out around it and the inner end of the socket is closed by a packing or washer 17 which makes a close fit around the tongue 12 and which retains the melted metal and prevents it from flowing toward the female parts 7 and 8 of the switch.

The upper side or top of the housing 2 has a small indentation 15 molded therein. This indentation is in line with the tongue 12 on the female part of the switch and is in line with the outer end of the socket on the lead connecting bar. From this indentation a hole can be drilled down in the housing and through the top and bottom of the lead socket and through the copper tongue 12 for the purpose of separating the lead connection 13 from the female part of the switch. This hole is not drilled into the socket except when it is desired to rebuild the battery, in which case it is necessary to take the lead connection 13 and the copper parts 7, 8 and 12 apart, and this is most easily done by drilling a hole through it. When it is desired to remove these old connections and replace them with new ones, a drill is inserted in this depression, which cuts down through the lead and copper joints and thus cuts through and across both parts, so that the lead connection can be taken out on one side of the housing and the copper connection can be taken out on the other side. New copper and lead parts can then be inserted and burned together by flowing melted metal the same as originally.

The parts 7 and 8 of the switch have lugs 19 and 20 formed therein so that they stand in a horizontal position at right angles to the parts 7 and 8. These lugs are adapted to engage with horizontally extending recesses formed at either side of the vertical housing. This engagement holds the parts 7 and 8 of the switch against downward movement and thus securely holds the parts in place after engagement with the lead connection 13 is completed. The lower edges of the copper plates 7 and 8 are flared outwardly as indicated at 21 and 22 at the bottom to fit the flared sides 14 at the bottom of the housing and act as guides for the flat end of the copper connection 9 when it is inserted in the opening. This is intended to more easily secure the bringing together and fitting of the parts into their proper places when the battery is being lowered into its pocket or compartment that is provided therefor in the car.

The pocket for the female part of the switch may be placed on the housing so as to open horizontally therefrom instead of downwardly therefrom, which horizontal opening is shown in Figure 7. In this case the housing will have no downward opening but will inclose the female switch all around except at the side of the housing from which the female switch is inserted to engage the tongue 12 with the socket in the end of the lead connection in which case the socket will be formed transversely in the enlarged end of the lead connection as shown at 24 in Figure 8 instead of opening longitudinally from the end thereof as shown in Figure 3. Otherwise the lead connection 13 is the same in both cases and the joint between the lead and the copper will be completed by pouring melted metal the same as above described. In this case, the flat male end of he cable connection will go in endwise or horizontally between the two female members 26 and 27 instead of going in vertically in the connections shown in Figures 2, 3 and 4 above described.

As shown in Figures 2, 3 and 4, the male copper connections from the battery to the car and to the ignition and lighting system thereof must all be in place before the battery is placed in the compartment that is adapted to receive it in the car, and as the battery is lowered, or removed, it will make or break the connection automatically.

In the second form shown, the battery is placed in the compartment of the car and the connections are then made to the battery by hand by inserting the flat end of the male part of the cable endwise between the female parts of the switch, which is adapted thereto. In such case the outer or exposed end of the female part of the switch is slightly tapered and sharpened outwardly to receive the likewise sharpened or wedge-shaped end of the entering male part of the switch. In both cases the edge of the end of the male part of the switch is sharpened, while in the first case the lower sides of the female switch are flared as is shown in Figure 4, and in the second case the exposed ends of the female parts of the switch are only rounded off outwardly leaving the blades straight and not flared in themselves.

It will also be understood that the female parts of the switch are made so that they must spring slightly apart on the entrance of the male part, thus giving a snug and tight fit to all the parts engaged. This serves to hold the middle part in engagement.

It will also be understood that a cable or connection to which the male part of the switch is attached will be covered with insulating material and will be clamped to the body or framework of the car between additional insulating parts such as rubber or fiber washers placed above and below the already insulated switch members. This is not true of the ground connection, for the insulation may be omitted therefrom and the bare copper member may be bolted or clamped to the metal frame or other part of the car.

In Figure 9 I have shown a modified form of the connection in which 30 indicates a copper tube flattened horizontally in the intermediate part thereof, as indicated at 31 and leaving one end tubular, as indicated at 32 to be used as a socket, which socket is adapted to receive the end of the cable 35. The other end of the copper tube is flattened vertically as indicated at 33, at right angles to the intermediate part 31, forming a narrow rectangular socket adapted to receive the end of the ribbon of copper 34. This copper ribbon is coiled as shown at 36 and on the upper end terminates in a pocket 39 or sleeve that is adapted to receive a cap 37, which has an internal flange 38 thereon that is adapted to nest in the pocket 39 formed on the upper end of the spiral 36. In the top of the opening in the housing 40, I provide a copper plate 41. A tongue 43 projects laterally from the plate 41 through an opening in the housing. This tongue engages in a socket 44 in the lead tie bar 45, and the joint is sealed by pouring melted metal into the groove or gate 46 as above described in connection with Figures 1 and 3.

The side of the housing is provided with a small indentation 47 molded therein, which indentation is in line with the tongue 43 and the outer end of the socket. From this indentation a hole can be drilled horizontally in the housing and through the sides of the lead socket, and through the copper tongue 43 for the purpose of separating the lead connection 45 from the copper plate 41 of the switch mechanism. It will also be understood that the other side of the battery box is furnished with the finger holes 5 and 6 as shown in Figure 2.

With this arrangement, it will be understood that the bottom of the ribbon of copper 34 and the copper tube 31 will be supported by a bracket from the frame of the car similar to what is shown in Figure 3, and this in turn supports the cap 37. The copper plate 41 and lead connection 45 are put in place on the battery and the battery is then let down into the receptacle that is intended to receive it in the car, and in so doing the copper plate 44 makes contact with the cap 37 and completes the circuit on that side of the battery, which circuit will not be broken until the battery is lifted out.

As shown in Figures 9 and 10, I use a packing 17 for the same purpose as is explained in connection with Figure 3.

I claim:

1. A metal tie bar having a socket at one end thereof, a contact member having female metal switch blades having a tongue thereon adapted to engage in said socket and form a junction therewith, a housing surrounding said junction, said tie bar having a groove thereon above the socket which groove is adapted to receive molten metal and feed it to the junction in the housing for the purpose of uniting the parts together.

2. A metal tie bar having a socket at one end thereof, a contact member having female metal switch blades having a tongue thereon adapted to engage in said socket and form a junction therewith, a housing surrounding said junction, said tie bar having a groove thereon above the socket which groove is adapted to receive molten metal and feed it to the junction in the housing for the purpose of uniting the parts together, said housing having a depression therein over the junction between the socket and tongue, said socket and tongue being capable of being cut apart by drilling down through them from said depression.

3. A battery box having a housing formed thereon as an integral part thereof, said housing having a partition therein forming two pockets, one of said pockets opening inwardly towards the battery and the other pocket opening outwardly therefrom, said housing and its partition being formed of insulating material, said partition having a narrow passage therein connecting said pockets, an electrical connection placed in each of said pockets, one of which connections extends through the partition from one pocket into the other pocket.

4. A battery connection comprising a battery box having a housing formed thereon as an integral part thereof, said housing having a partition therein forming two pockets therein, one of said pockets opening inwardly towards the battery and the other pocket opening outwardly therefrom, a metal tie-bar having an end that engages in the inwardly opening pocket, the other end being connected to one of the battery terminals, a contact member having two female switch blades engaging in the outwardly opening pocket and having a tongue thereon extending through the housing into the inwardly opening pocket, said metal tie-bar having a socket therein in which said tongue engages to make electrical contact therewith.

5. A battery connection comprising a battery box having a housing formed thereon as an integral part thereof, said housing having a partition therein forming two pockets therein, one of said pockets opening inwardly toward the battery and the other pocket opening outwardly therefrom, a metal tie-bar having an end that engages in the inwardly opening pocket, the other end being connected to one of the battery terminals, a contact member having two female switch blades engaging in the outwardly opening pocket and having a tongue thereon extending through the housing into the first-named pocket, said metal tie-bar having a socket therein in which said tongue engages to make electrical contact therewith, said socket and said inwardly opening pocket being adapted to receive molten metal for the purpose of joining said tie-bar and said tongue together.

6. A battery connection comprising a battery box having a housing formed thereon as an integral part thereof, said housing having a partition therein forming two pockets therein, one of said pockets opening inwardly toward the battery and the other pocket opening outwardly therefrom, a metal tie-bar having an end that engages in the inwardly opening pocket, the other end being connected to one of the battery terminals, a contact member having two female switch blades engaging in the outwardly opening pocket and having a tongue thereon extending through the housing into the inwardly opening pocket, said metal tie-bar having a socket therein in which said tongue engages to make electrical contact therewith, lugs on said female switch blade extending outwardly therefrom, recesses in said housing at either side of the outwardly opening pocket, said lugs being adapted to engage in said recesses.

7. The combination of a storage battery and a battery box, said box having a housing made integral therewith and projecting outwardly from the upper edge thereof, said housing having an opening therein opening downwardly therefrom outside of the battery box, a switch contact in said opening, said contact comprising two plates suitably spaced apart, a stationary contact fastened at the side of the resting place of the box, said contact comprising an upwardly extending blade adapted to engage between the two plates of the switch contact and be overlapped thereby, said contacts being brought together by lowering the battery box into its resting place at the side of the stationary contact.

8. A battery box having a housing formed thereon as an integral part thereof, said housing having a partition therein forming two pockets, said housing and partition being made of insulating material, one of said pockets opening inwardly toward the battery and the other pocket opening outwardly therefrom, said partition having a narrow passage therein connecting said pockets, a lead tie bar extending into the inwardly opening pocket, said tie bar having a socket in the end thereof in the pocket, a copper conductor having a tongue thereon extending through the opening in the partition into the socket of the tie bar.

GEORGE G. GREGER.